(12) United States Patent
Kawatani et al.

(10) Patent No.: US 9,017,846 B2
(45) Date of Patent: Apr. 28, 2015

(54) STRUCTURE FOR MOUNTING CYLINDRICAL BATTERY ON ELECTRIC VEHICLE

(71) Applicant: Honda Motor Co., Ltd., Tokyo (JP)

(72) Inventors: Shinji Kawatani, Wako (JP); Yoshitaka Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 13/847,604

(22) Filed: Mar. 20, 2013

(65) Prior Publication Data

US 2013/0288097 A1    Oct. 31, 2013

(30) Foreign Application Priority Data

Mar. 30, 2012 (JP) .................... 2012-082478

(51) Int. Cl.
| | | |
|---|---|---|
| *H01M 2/10* | (2006.01) | |
| *H01M 2/06* | (2006.01) | |
| *H01M 2/30* | (2006.01) | |
| *H01M 2/02* | (2006.01) | |
| *B60L 11/18* | (2006.01) | |
| *B60K 1/04* | (2006.01) | |

(52) U.S. Cl.
CPC .......... *H01M 2/1083* (2013.01); *H01M 2/0237* (2013.01); *H01M 2/1011* (2013.01); *H01M 2/305* (2013.01); *B60L 11/1803* (2013.01); *B60L 11/1822* (2013.01); *B60L 11/1861* (2013.01); *B60L 11/1877* (2013.01); *B60K 1/04* (2013.01); *H01M 2/1005* (2013.01); *H01M 2220/30* (2013.01); *B60L 2200/12* (2013.01); *B60K 2001/0461* (2013.01); *B60Y 2200/12* (2013.01)

(58) Field of Classification Search
CPC ............ H01M 2/0237; H01M 2/1011; H01M 2/1083; B60L 11/1877
USPC ................................................ 429/100, 164
See application file for complete search history.

(56) References Cited

U.S. PATENT DOCUMENTS

| 5,633,095 | A | * | 5/1997 | Ishikawa et al. ................... 429/1 |
| 5,789,898 | A | * | 8/1998 | Suzuki et al. .................. 320/104 |
| 8,469,381 | B2 | * | 6/2013 | Dodman et al. ............ 280/281.1 |
| 8,893,837 | B2 | * | 11/2014 | Kwag et al. ................... 180/68.5 |
| 2004/0229119 | A1 | * | 11/2004 | Lin et al. ........................ 429/164 |
| 2008/0088108 | A1 | * | 4/2008 | Yoshida et al. ................ 280/200 |

FOREIGN PATENT DOCUMENTS

JP    04-143123    5/1992

* cited by examiner

*Primary Examiner* — Jonathan Jelsma

(74) *Attorney, Agent, or Firm* — Squire Patton Boggs (US) LLP

(57) ABSTRACT

A cylindrical battery includes a pair of female terminals. One of the pair of female terminals is placed at the axial center of the battery, and provided to recede from one end surface of the battery. The other terminal is placed in a position away from the axial center, to recede from the one end surface of the battery. A male thread portion is provided on an outer peripheral surface of the battery. A handle portion is provided on another end surface of the battery. A female thread portion to be threadedly engaged with the male thread portion is provided in an inner peripheral surface of the battery box. A pair of male terminals are provided on a bottom surface of the battery box. The battery is designed to be detachably mounted inside the battery box by being rotated inside the battery box.

9 Claims, 5 Drawing Sheets

(A)

(B)

(C)

STRUCTURE FOR MOUNTING CYLINDRICAL BATTERY ON ELECTRIC VEHICLE

BACKGROUND

1. Field

The present invention relates to a structure for mounting a cylindrical battery on an electric vehicle.

2. Description of the Related Art

A saddle riding type electric vehicle in which a cylindrical battery is detachably mounted is disclosed in Patent Document 1, Japanese Patent Application Publication NO. Hei 04-143123 (refer to FIG. 5 to FIG. 9 in the document in particular).

In the conventional cylindrical battery, electrodes (feed terminals) are provided on one end surface and an outer peripheral surface, and a threaded lid member is attached after the battery is mounted on a vehicle body. However, this configuration requires attention to avoid contact of the electrodes with other regions during an operation to attach or detach the battery. In addition, since the lid member is attached after the battery is mounted, the operation to attach or detach the battery is troublesome.

The above-described cylindrical battery has a shape that makes the battery difficult to mount compactly on the vehicle. Nevertheless, the battery is expected to be mounted on the vehicle as compactly as possible.

SUMMARY

Embodiments of the present invention have been made in view of the above-mentioned circumstances, and an object thereof is to provide a structure for mounting a cylindrical battery on an electric vehicle, which facilitates an operation to attach or detach a cylindrical battery to or from an electric vehicle.

As means for solving the foregoing problems, an embodiment of the invention provides a structure for mounting a cylindrical battery on an electric vehicle configured to detachably mount a cylindrical battery in a cylindrical battery box provided in the vehicle. The battery includes a pair of female terminals, one of the pair of female terminals can be placed in an axial center of the battery and can be provided in such a manner as to recede from one end surface of the battery. The other terminal can be placed in a position away from the axial center and provided in such a manner as to recede from the one end surface of the battery. A male thread portion is provided on an outer peripheral surface of the battery. A handle portion is provided on the other end surface of the battery. A female thread portion to be threadedly engaged with the male thread portion is provided in an inner peripheral surface of the battery box. A pair of male terminals to be connected to the female terminals are provided on a bottom surface of the battery box. The battery is detachably mounted inside the battery box by being rotated inside the battery box.

In another embodiment, one male terminal of the pair of male terminals to be connected to the other one of the pair of female terminals has a tip configured to be capable of being pushed into the female terminal in a biased state. A guide groove is formed in the one end surface of the battery. The guide groove can be connected to the other one of the pair of female terminals, extending in a circumferential direction around the axial center of the battery, and gradually increasing a depth as the groove approaches the other one of the pair of female terminals. A step is formed in a region where the other one of the pair of female terminals is connected to the guide groove.

In another embodiment, at least the one battery box is formed in an electric component box provided in the vehicle. A controller is provided, and is configured to control power to be supplied from the battery to a motor. A down regulator is provided, and configured to step down the power of the battery. A battery management unit is configured to manage the charging of the battery. The controller, down regulator, and battery management unit are provided in the electric component box. The battery box is formed in such a manner as to avoid the controller, the down regulator, and the battery management unit.

In another embodiment, at least two battery boxes are formed. A wire for electrically connecting the batteries to be respectively housed in the battery boxes is provided in a space between the adjacent battery boxes among at least the two battery boxes.

In another embodiment, the electric component box is provided with an openable and closable lid member having a key cylinder. A projecting portion configured to come into contact with the battery and to restrict the rotation of the battery is provided on an inner surface of the lid member opposed to the other end surface of the battery.

In another embodiment, the battery box is opened outward in a vehicle width direction.

According to certain embodiments, a user can attach or detach the battery to and from the inside of the battery box by rotating the battery while gripping the handle portion provided on the other end surface which is located on the opposite side of the battery from the one end surface. The female terminals recede from the one end surface of the battery, and are therefore less likely to interfere with the other components and the like in an attaching or detaching operation. Moreover, it is not necessary to provide a lid member, for example, for preventing the battery from coming off. Hence, the operation to attach or detach the battery can be performed easily.

In certain embodiments, the tip of the male terminal of the battery box, which is to be connected to the female terminal located away from the axial center of the battery, can be smoothly connected to the female terminal in such a way that the tip retracted with the one end surface of the battery is guided to the female terminal along the guide groove of the battery, and is expanded after reaching the female terminal. In addition, the battery can be maintained in an electrically connected state by locating the male terminal of the battery box adjacent to the step.

According to certain embodiments, the various electric components and the battery are efficiently mounted in the electric component box, and the electric component box can be made compact. In addition, more components can be provided by effective use of a space between two battery boxes, and the components can be provided efficiently in the electric component box. To be more precise, it is possible to arrange the wire in the space between the two battery boxes.

According to certain embodiments, the battery can be positioned and also be protected against theft by means of the lid member.

In certain embodiments, the operation to attach or detach the battery can be performed more easily than in the case of housing the battery in a vertical direction and the like.

DETAILED DESCRIPTION

Figure 1:
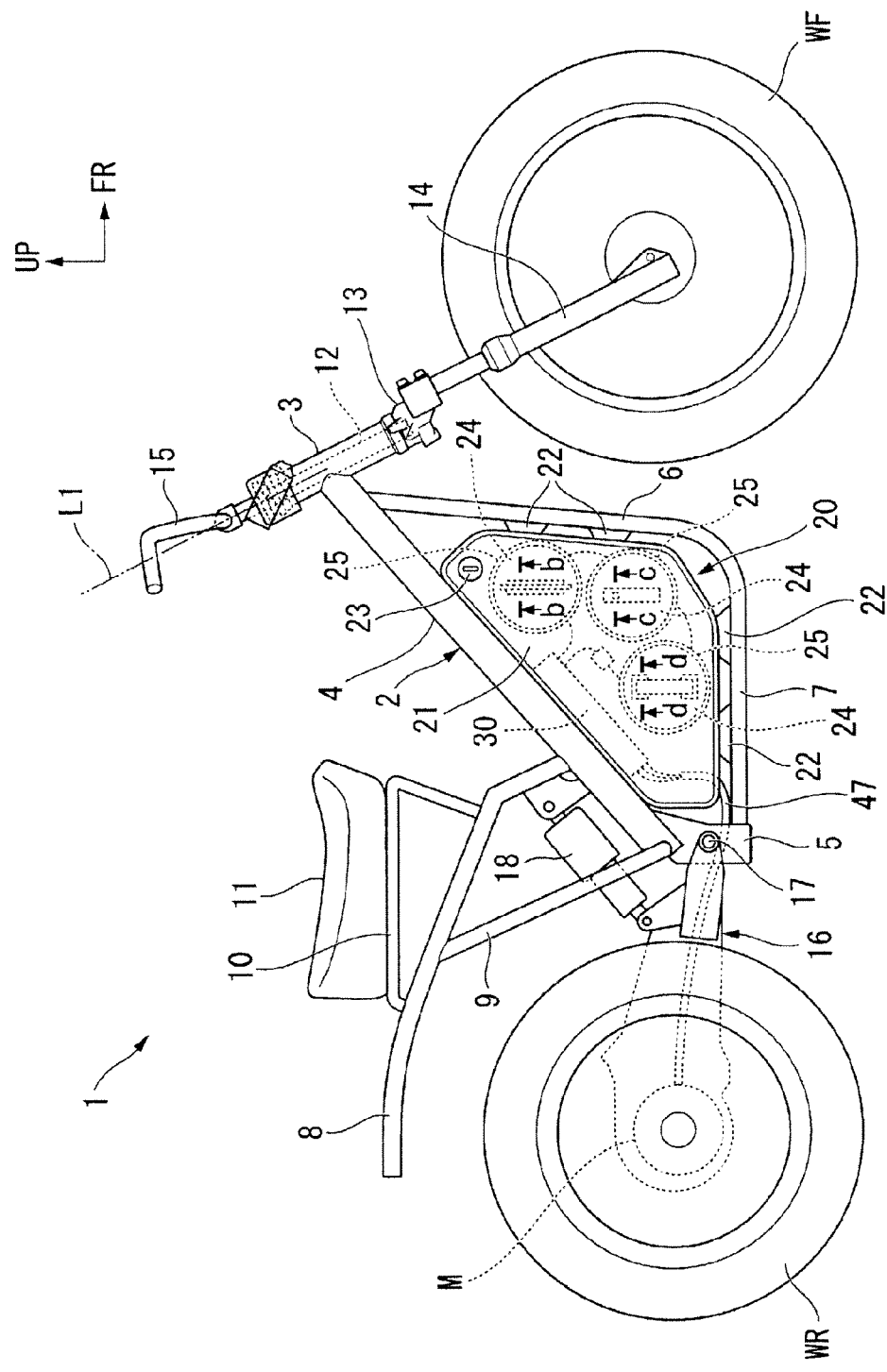
FIG. 1 is a right side view of a saddle riding type electric vehicle adopting a structure according to embodiments of the present invention.

An embodiment of the present invention will be described below with reference to the drawings. In the drawings used hereinbelow, it is to be noted that: an arrow FR indicates a front side of a vehicle; and an arrow UP indicates an upper side of the vehicle. As shown in FIG. 1, a saddle riding type electric vehicle 1 adopting a structure according to this embodiment includes a vehicle body frame 2 formed of multiple frames.

The vehicle body frame 2 can include one main frame 4 extending rearward, or more specifically, rearward and downward from a head pipe 3. A left and right pair of pivot frames 5 extend downward from a rear end of the main frame 4. A down frame 6 extends downward from a front end of the main frame 4. A bottom frame 7 extends rearward from a lower end of the down frame 6 and has a rear end connected to the pivot frames 5. A left and right pair of seat frames 8 extend rearward and upward from a rear part of the main frame 4. A left and right pair of support frames 9 each extend rearward and upward from a rear end of the main frame 4 and connected to a region located substantially in the center in a front-rear direction of each seat frame 8.

The down frame 6 and the bottom frame 7 are integrated with each other, and formed into an L-shape in a lateral view. In addition, a seat support frame 10 having a horizontal region extending in the front-rear direction in a horizontal direction is fixed to upper parts of the seat frames 8. A seat 11 for a driver to be seated on is supported by the horizontal region of this seat support frame 10.

A steering shaft 12 is turnably supported by the head pipe 3. Upper and lower end portions of the steering shaft 12 protrude outward from the head pipe 3. A bridge member 13 extending in a vehicle width direction is fixed to a lower end of the steering shaft 12, and upper ends of front forks 14 are respectively fixed to both end portions of the bridge member 13. In addition, a front wheel WF is rotatably supported by lower ends of the front forks 14. A handlebar 15 formed of a single pipe material is fixed to an upper end of the steering shaft 12. Note that L1 in the drawing indicates an axial line of the steering shaft 12.

A front portion of a swing arm 16 is swingably supported by the pivot frames 5 via a pivot shaft 17. The swing arm 16 is of a cantilever type which is configured to pivotally support a rear wheel WR only with an arm on the left side in the vehicle width direction. An electric motor M which drives the rear wheel WR is housed in a rear portion of the swing arm 16.

In addition, a rear cushion unit 18 is provided between the seat frame 8 and the front portion of the swing arm 16.

In addition to the electric motor M, a centrifugal clutch as a connection-disconnection mechanism for rotation drive force and a deceleration mechanism (neither of which is shown) are concentratedly arranged inside the swing arm 16. In other words, the swing arm 16, the electric motor M, and the like collectively constitute a swing unit which is a power train of the saddle riding type electric vehicle 1.

An electric component box 20 configured to house various electric components is provided in a space formed from the main frame 4, the down frame 6, the bottom frame 7, and the pivot frames 5. This electric component box 20 is formed substantially in a triangular shape in a lateral view.

In the electric component box 20, one side of the three sides that form the substantially triangular shape in the lateral view is aligned with the vertical direction and fixed to the down frame 6, while a side extending rearward from a lower end of the side fixed to the down frame 6 is aligned with the front-rear direction and fixed to the bottom frame 7. In the meantime, the side of the electric component box 20 which is not fixed to any of the down frame 6 and the bottom frame 7 extends along a lower surface of the main frame 4 in the proximity of this lower surface.

Here, reference numeral 22 in the drawing denotes multiple brackets fixed to the down frame 6 and the bottom frame 7, which are configured to anchor the electric component box 20 by means of fastening and the like.

The electric component box 20 is openably covered with a lid member 21 from an outer side (right side) in a vehicle width direction. The lid member 21 is formed substantially in a triangular shape in a lateral view. The lid member 21 is provided with a key cylinder 23 with a keyhole exposed to the outer side. The key cylinder 23 locks the lid member 21 with the electric component box 20 by an operation of a key inserted in the keyhole, and releases the locked state by an operation of the key. In this embodiment, although the key cylinder 23 is provided on an upper corner of the lid member 21 with the lid member 21 attached to the electric component box 20, the key cylinder 23 may be provided in any other positions. Nevertheless, operations become easier by providing the key cylinder 23 in as high a location as possible.

Figure 2:
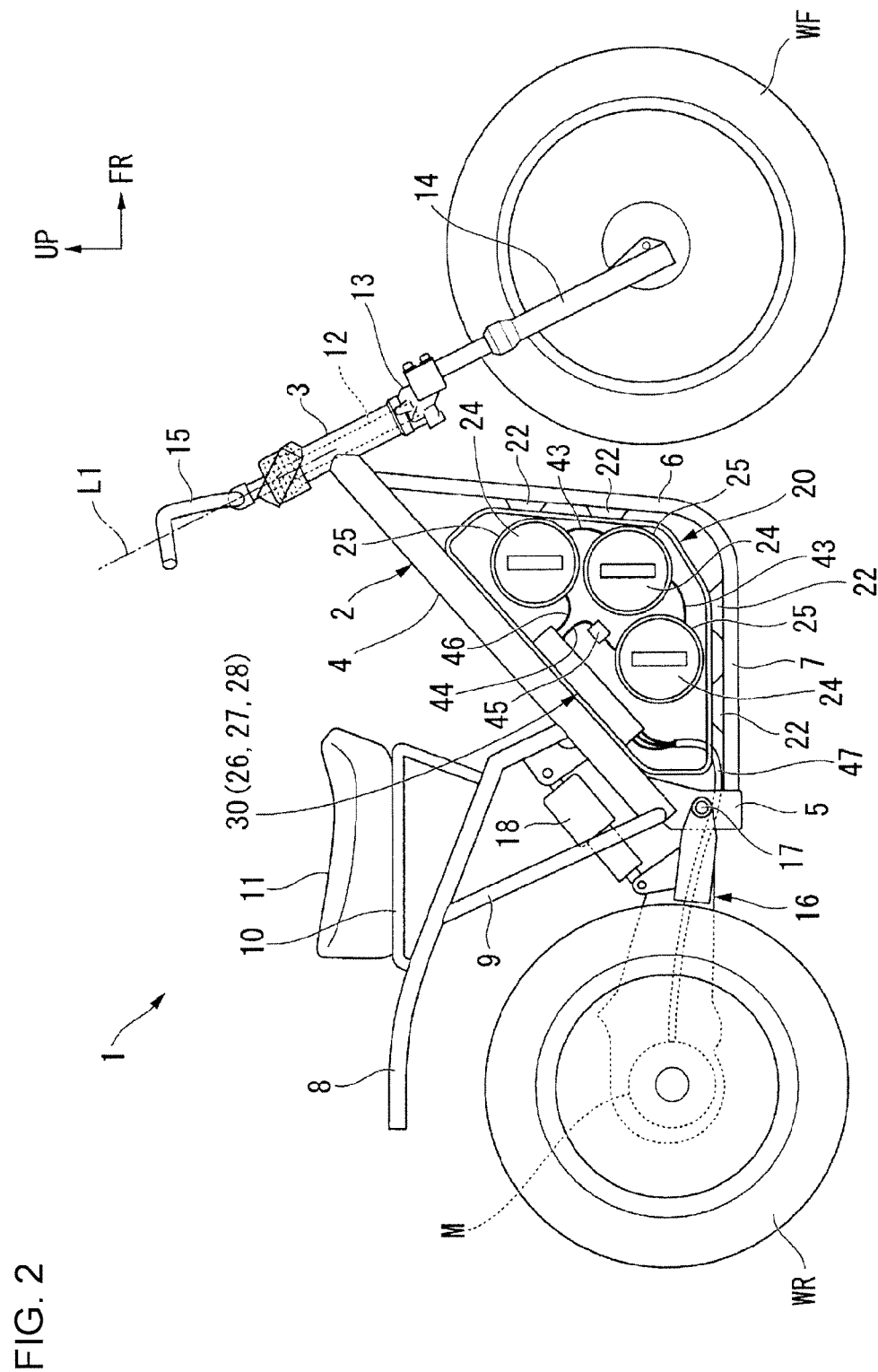
FIG. 2 is a right side view of the saddle riding type electric vehicle in a state where a lid member for an electric component box of the saddle riding type electric vehicle is detached.

FIG. 2 shows a state where the lid member 21 is detached. Three cylindrical battery boxes 25 each configured to house a cylindrical battery 24 in its inside are formed in the electric component box 20. Each battery box 25 is arranged with its axial line extended in the vehicle width direction and is opened outward (to the right side) in the vehicle width direction. In addition, a power supply unit 30, which integrates a controller (PDU; power drive unit) 26 configured to control output from the batteries 24 to the electric motor M, a down regulator 27 configured to step down the power from the batteries 24, and a battery management unit 28 configured to manage a charge status of the batteries 24 together, is provided in the electric component box 20.

The controller 26 can include an inverter circuit configured to transform a direct-current voltage supplied from the batteries 24 into a three-phase alternating-current voltage and to supply the transformed voltage to the electric motor M. A control unit is configured to execute prescribed control on the basis of an output signal from the battery management unit 28, and the like. The down regulator 27 is configured to step down the direct-current voltage supplied from the batteries 24, and to output the stepped-down voltage to an auxiliary battery and the like, which are not illustrated. The battery management unit 28 is configured to recognize the charge status of the batteries 24, and to output information on the charge status to the controller 26.

The power supply unit 30 is formed in a rectangular shape in a lateral view, and is provided below a region in the electric component box 20 along the main frame 4 and in such a manner as to align its longitudinal direction therewith. A front end of the unit 30 is located substantially in a central region in the front-rear direction of the electric component box 20.

The three battery boxes 25 are formed to avoid the power supply unit 30, i.e., arranged in an L-shape across a region in the electric component box 20 along the down frame 6 and a region in the electric component box 20 along the bottom frame 7. Here, the power supply unit 30 is located to be surrounded by the multiple battery boxes 25 from the front and lower sides.

Figure 3:
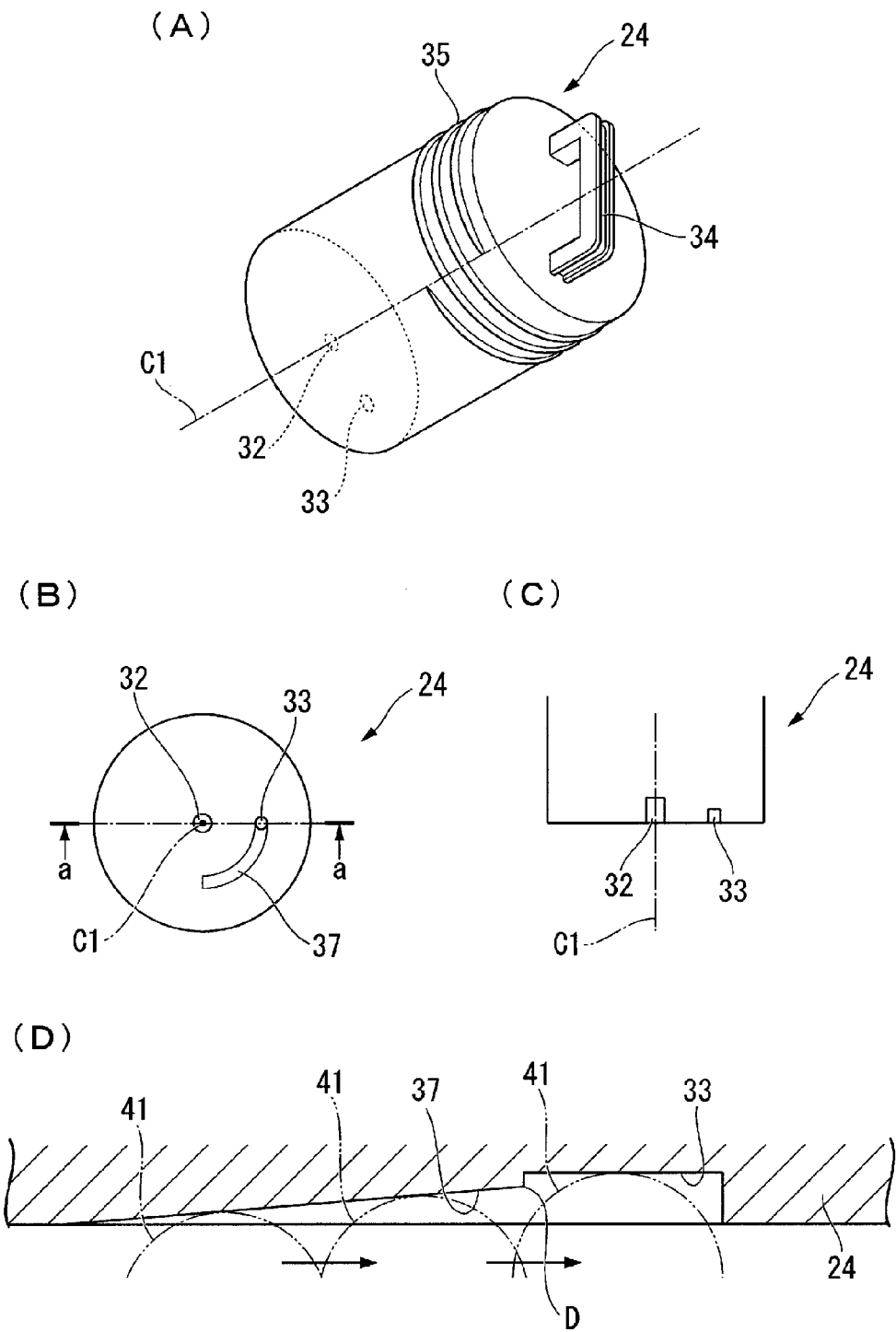
FIG. 3 is a view showing a battery to be mounted on the saddle riding type electric vehicle, in which: part (A) is a perspective view of the battery; part (B) is a view showing an end surface of the battery; part (C) is a cross-sectional view of the battery taken along the a-a line in part (B); and part (D) is a cross-sectional view of a guide groove to be formed in the end surface of the battery, which is taken along a longitudinal direction of the guide groove.

FIG. 3 shows the battery 24. The battery 24 is formed in a cylindrical shape to be inserted into the inside of the cylindrical battery box 25. The battery 24 houses a lithium ion battery and the like in a cylindrical case. In the drawings, C1 denotes an axial line of the battery 24.

As shown in FIGS. 3(A) to 3(C), a female positive electrode terminal 32 and a female negative electrode terminal 33 are provided in one end surface of the battery 24 in the direction of the axial line C1. In this embodiment, the female positive electrode terminal 32 is placed on the axial center (on the axial line C1) of the battery 24 and is provided to recede from the one end surface of the battery 24. The female negative electrode terminal 33 is placed in a position on the one end surface of the battery 24 which is outwardly away from the axial center in the radial direction, and in such a manner as to recede from the one end surface.

In addition, a U-shaped handle portion 34 that can be gripped by a user is provided on the other end surface of the battery 24 in the direction of the axial line C1. A male thread portion 35 is provided on an outer peripheral surface between the center in the direction of the axial line C1 and the other end surface of the battery 24. The handle portion 34 is formed in the U-shape from: a pair of opposed portions erected on the other end surface of the battery 24 and opposed to each other across the axial line C1; and a joint portion joining tips of the opposed portions to each other. Each of the opposed portions and the joint portion is formed in a U-shaped cross section which is opened outward.

Figure 4:
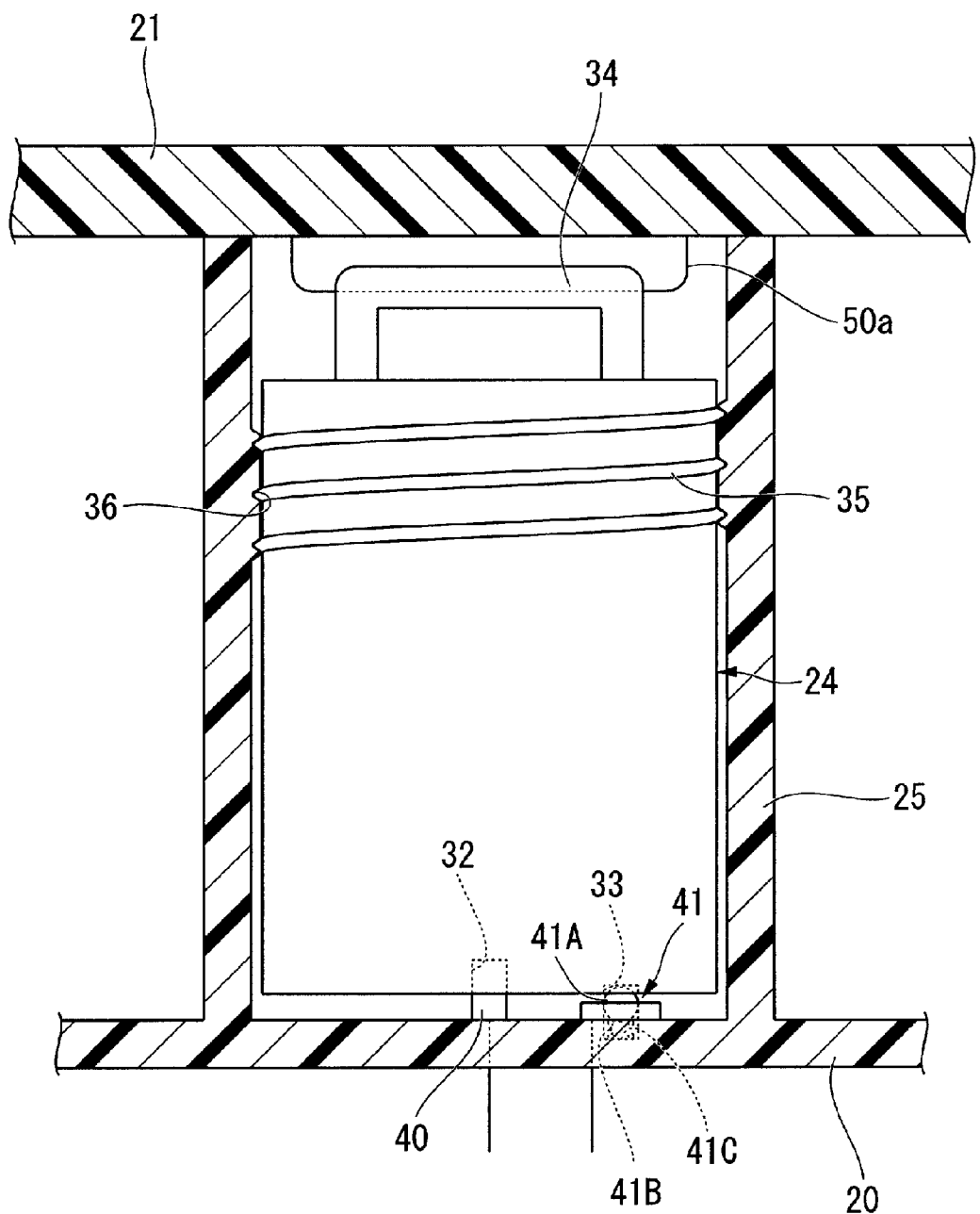
FIG. 4 is a cross-sectional view of a battery box and the lid member of the saddle riding type electric vehicle, which is taken along an axial line of the battery box.

FIG. 4 shows a cross-sectional view of the battery box 25 and the like taken along an axial direction in the case where the battery 24 is mounted in the battery box 25. Note that the battery 24 is shown, but not in the cross section for the convenience of description. The battery 24 is mounted inside the battery box 25 by being inserted and rotated inside the battery box 25. While the battery 24 is in the mounted state, with a rotating operation of the battery 24, the male thread portion 35 is threadedly engaged with a female thread portion 36 provided on an inner peripheral surface of the battery box 25, and the battery 24 and the saddle riding type electric vehicle 1 are put into an electrically communicating state.

A bottom surface of the battery box 25 can be provided with a male positive electrode terminal 40 to be connected to the female positive electrode terminal 32. A male negative electrode terminal 41 can be connected to the female negative electrode terminal 33. Both of the male positive electrode terminal 40 and the male negative electrode terminal 41 protrude from the bottom surface of the battery box 24, and are inserted into the female positive electrode terminal 32 and the female negative electrode terminal 33, respectively. Thus, the battery 24 and the saddle riding type electric vehicle 1 are put into the electrically communicating state. Here, the bottom surface of the battery box 25 is the end surface of the battery box 25 in the axial direction, which is located on the opposite side of the battery box 25 from the opened side.

The male negative electrode terminal 41 can protrude from the bottom surface of the battery box 25 in a position located away from the axial center thereof, and is configured to have a tip portion 41A capable of pushing into the female negative electrode terminal 33 in a state biased to the female negative electrode terminal 33. In FIG. 4, reference numeral 41B denotes a spring which biases the tip portion 41A. The spring 41B is housed in a hole portion 41C formed in the bottom surface of the battery box 25.

On the other hand, as shown in FIGS. 3(B) and 3(D), a guide groove 37 is formed on the one end surface of the battery 24 in the direction of the axial line C1. The guide groove 37 is connected to the female negative electrode terminal 33, extends in a circumferential direction which is a direction of revolution of the battery 24 around the axial line C1, and gradually increases its depth as the groove approaches the female negative electrode terminal 33. Moreover, a depth of the female negative electrode terminal 33 is set greater than a depth of an end portion of the guide groove 37 connected thereto. Thus, a step D is formed between the female negative electrode terminal 33 and a region of the guide groove 37 connected to the female negative electrode terminal 33. Meanwhile, an end portion out of the end portions of the guide groove 37 in the longitudinal direction, which is on the opposite side of the guide groove 37 from the end portion connected to the female negative electrode terminal 33, is smoothly connected to the one end surface of the battery 24 without a step.

Thus, with reference to FIG. 3(C), when the battery 24 is inserted and rotated inside the battery box 25, the tip 41A of the male negative electrode terminal 41 is designed to be smoothly connectable to the female negative electrode terminal 33 in such a way that the tip 41A retracted by way of the one end surface of the battery 24 is guided to the female negative electrode terminal 33 along the guide groove 37 of the battery 24, and is expanded after reaching the female negative electrode terminal 33. In addition, the battery 24 can be maintained in the electrically connected state by locating the male negative electrode terminal 41 adjacent to the step D between the guide groove 37 and the female negative electrode terminal 33.

Moreover, in this embodiment, the three batteries 24 in the electric component box 20 are electrically connected to one another by two wires 43 as shown in FIG. 2. Here, one of the two wires 43 is provided in a space between the battery boxes 25 adjacent in the vertical direction behind the down frame 6, and is configured to electrically connect the batteries 24 to be housed therein, which are adjacent in the vertical direction. The other one of the two wires 43 is provided in a space between the battery boxes 25 adjacent in the front-rear direction above the bottom frame 7, and is configured to electrically connect the batteries 24 to be housed therein, which are adjacent in the front-rear direction.

In addition, the power is supplied from the battery 24 among the three batteries 24, which is located immediately below the power supply unit 30, to the power supply unit 30. These are connected together by a supply cable 44, and a fuse 45 is provided in the middle of the supply cable 44. Reference numeral 46 denotes a grounding cable.

A three-phase cable 47 for supplying the three-phase alternating current transformed by the controller 26 to the electric motor M is connected to a rear part of the power supply unit 30. The three-phase cable 47 is drawn rearward, passed through the swing arm 16, and connected to the electric motor M.

As shown in FIG. 4, a projecting portion 50a that comes into contact with the other end surface of the battery 24 (the handle portion 34 of the battery 24 in this embodiment) is provided on an inner surface of the lid member 21 which is opposed to the other end surface of the battery 24 provided with the handle portion 34. This projecting portion 50a restricts the rotation of the battery 24, and thereby prevents the battery 24 from coming off. Note that FIG. 4 shows the one of the batteries 24 which is located in the highest place.

Figure 5:
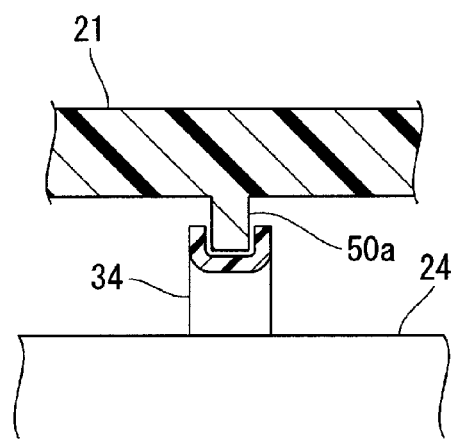
FIG. 5 includes: part (A) which is a cross-sectional view taken along the b-b line in FIG. 1; part (B) which is a cross-sectional view taken along the c-c line in FIG. 1; and part (C) which is a cross-sectional view taken along the d-d line in FIG. 1.
Figure 5:
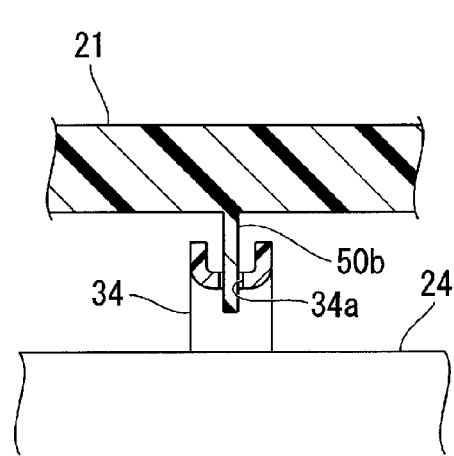
Figure 5:
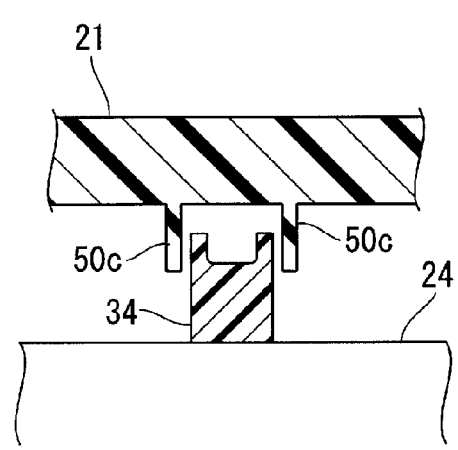

With reference to FIG. 5(A), the projecting portion 50a is configured to be inserted along the axial line C1 of the battery 24 into the U-shaped open part on the joint portion of the handle portion 34, which is opened toward the projecting portion 50a, thereby to restrict the rotation of the battery 24. To be more precise, the projecting portion 50a extends relatively long along the joint portion of the handle portion 34, and is configured to restrict the rotation of the battery 24, which is about to rotate, by coming into contact with a wall of the U-shaped open part on the joint portion of the handle portion 34.

The projecting portions 50a of the same type as described above are usually formed on the lid members 21 corresponding to the multiple batteries 24, respectively. Nevertheless, in this embodiment, a projecting portion 50b and a projecting portion 50c having different shapes from the shape of the projecting portion 50a are formed on the respective lid members 21 for the convenience of explanation. The projecting portion 50b is formed below the projecting portion 50a, and the projecting portion 50c is formed in the rear of the projecting portion 50b. Moreover, the projecting portion 50b is shown in FIG. 5(B) which is a cross section taken along the c-c line in FIG. 1, and the projecting portion 50c is shown in FIG. 5(C) which is a cross section taken along the d-d line in FIG. 1.

As shown in FIG. 5(B), the projecting portion 50b is configured to be inserted into a through-hole 34a formed in a position on the joint portion of the U-shaped handle portion 34 which is located outwardly away from the axial line C1 of the battery 24 in the radial direction, and to thereby restrict the rotation of the battery 24.

As shown in FIG. 5(C), the projecting portion 50c is configured to sandwich the handle portion 34 from two sides with the axial line C1 of the battery 24 in between and to restrict the rotation of the battery 24 by coming into contact with the handle portion 34 if the battery 24 is about to rotate. Here, the projecting portion 50c is configured to sandwich the handle portion 34 from two sides across the axial line C1. However, the projecting portion 50c may be formed only on one side of the handle portion 34 on the basis of the axial line C1. Nevertheless, in this case, the projecting portion 50c needs to be formed long along the joint portion of the handle portion 34 across the axial line C1.

Operations to attach and detach the batteries 24 to and from the saddle riding type electric vehicle 1 according to this embodiment will be described below. In order to mount each battery 24, the user first grips the handle portion 34, inserts the battery 24 into the inside of the battery box 25, and then rotates the battery 24 to threadedly engage the male thread portion 35 with the female thread portion 36. Then, the male positive electrode terminal 40 is connected to the female positive electrode terminal 32, and the male negative electrode terminal 41 is connected to the female negative electrode terminal 33.

Since the guide groove 37 is provided in this case, the tip portion 41A of the male negative electrode terminal 41 can be smoothly connected to the female negative electrode terminal 33, and the battery 24 can be maintained in the electrically connected state as described previously. Then, the electric component box 20 is closed with the lid member 21, and the projecting portions 50a to 50c are brought into contact with the batteries 24 (the handle portions 34).

On the other hand, in order to detach each battery 24, the user first opens the lid member 21, then grips the handle portion 34, and detaches the battery 24 while performing a rotating operation in such a direction to pull out the battery 24.

As described above, the saddle riding type electric vehicle 1 of this embodiment has a configuration in which the battery 24 includes the pair of the female positive electrode terminal 32 and the female negative electrode terminal 33. One of the pair of the female positive electrode terminal 32 and the female negative electrode terminal 33 is placed at the axial center of the battery 24, and provided to recede from the one end surface of the battery 24. The other terminal is placed in the position away from the axial center, and provided to recede from the one end surface of the battery 24. The male thread portion 35 is provided on the outer peripheral surface of the battery 24; the handle portion 34 is provided on the other end surface of the battery 24; the female thread portion 36 to be threadedly engaged with the male thread portion 35 is provided on the inner peripheral surface of the battery box 25; the bottom surface of the battery box 25 is provided with the pair of the male positive electrode terminal 40 and the male negative electrode terminal 41 to be connected to the pair of the female positive electrode terminal 32 and the female negative electrode terminal 33; and the battery 24 is detachably mounted inside the battery box 25 by being rotated inside the battery box 25.

This configuration enables the user to attach or detach the battery 24 to or from the inside of the battery box 25 by rotating the battery 24 while gripping the handle portion 34 provided on the other end surface which is on the opposite side of the battery 24 from the one end surface. Since the female positive electrode terminal 32 and the female negative electrode terminal 33 recede from the one end surface of the battery 24, the terminals are less likely to interference with the other components and the like in the attaching or detaching operation. Moreover, since it is not necessary to provide a lid member for preventing the battery 24 from coming off, the operation to attach or detach the battery 24 can be performed easily.

The bottom surface of the battery box 25 is provided with the male positive electrode terminal 40 and the male negative electrode terminal 41 to be connected to the female positive electrode terminal 32 and the female negative electrode terminal 33. The male negative electrode terminal 41 to be connected to the female negative electrode terminal 33 is configured to have the tip portion capable of pushing into the female negative electrode terminal 33 in the state biased to the female negative electrode 33. The guide groove 37 is formed on the one end surface of the battery 24. The guide groove 37 is connected to the female negative electrode terminal 33, extends in the circumferential direction of the battery 24, and gradually increases the depth as the groove approaches the female negative electrode terminal 33. The step D is formed in the region where the female negative electrode terminal 33 is connected to the guide groove 37.

This makes it possible to smoothly connect the tip 41A of the male negative electrode terminal 41, which is to be connected to the female negative electrode terminal 33 located away from the axial center of the battery 24, to the female negative electrode terminal 33 in such a way that the tip 41A retracted with the one end surface of the battery 24 is guided to the female negative electrode terminal 33 along the guide groove 37, and is expanded after reaching the female negative electrode terminal 33. In addition, the battery 24 can be maintained in the electrically connected state by locating the male negative electrode terminal 41 adjacent to the step between the guide groove 37 and the female negative electrode terminal 33.

In addition, the three battery boxes 25 are formed in the electric component box 20 provided in the vehicle. The controller 26 configured to control the power to be supplied from the batteries 24 to the motor, the down regulator 27 configured to step down the power of the batteries 24, and the battery management unit 28 configured to manage the charging of the batteries 24 are provided in the electric component box 20. The battery boxes 25 are formed to avoid the controller 26, the down regulator 27, and the battery management unit 28.

This enables the various electric components and the batteries 24 to be efficiently mounted in the electric component box 20, and the electric component box 20 to be made compact. In addition, more components can be provided by effective use of a space between two battery boxes 25, and the components can be arranged efficiently in the electric component box. To be more precise, it is possible to provide the wire 43 in the space between the two battery boxes 25, for example.

In addition, the electric component box 20 is provided with the openable and closable lid member 21 having the key cylinder 23, and the projecting portions 50a to 50c configured to come into contact with the other end surfaces of the batteries 24 and thereby to restrict the rotation of the batteries 24 are provided on the inner surface of the lid member 21 which is opposed to the other end surfaces of the batteries 24. Thus, the batteries 24 can be positioned by the lid member 21, and protection against theft is also achieved.

Moreover, the battery boxes 25 are opened outward in the vehicle width direction. This makes it possible to perform the operation to attach or detach the batteries 24 more easily than in the case of housing the batteries 24 in a vertical direction and the like.

Although embodiments of the present invention has been described above, the present invention is not limited only to the above-described embodiments, and various modifications can be added within the scope departing from the gist of the present invention. For example, the number of batteries 24 and the number of battery boxes 25 may be set to 1, 2, 4 or more.

EXPLANATION OF THE REFERENCE NUMERALS

1 SADDLE RIDING TYPE ELECTRIC VEHICLE
23 KEY CYLINDER (LOCKING MEANS)
24 BATTERY
25 BATTERY BOX
26 CONTROLLER
27 DOWN REGULATOR
28 BATTERY MANAGEMENT UNIT
32 FEMALE POSITIVE ELECTRODE TERMINAL (FEMALE TERMINAL)
33 FEMALE NEGATIVE ELECTRODE TERMINAL (FEMALE TERMINAL)
34 HANDLE PORTION
35 MALE THREAD PORTION
36 FEMALE THREAD PORTION
37 GUIDE GROOVE
40 MALE POSITIVE ELECTRODE TERMINAL (MALE TERMINAL)
41 MALE NEGATIVE ELECTRODE TERMINAL (MALE TERMINAL)
43 WIRE
50a, 50b, 50c PROJECTING PORTION

The invention claimed is:

1. A battery for an electric vehicle, said battery comprising:
a pair of female terminals, one female terminal of the pair of female terminals being in an axial center of the battery, said one female terminal being recessed from a first end surface of the battery, and another female terminal of the pair of female terminals being disposed in a position away from the axial center, and recessed from the first end surface of the battery;
an outer peripheral surface, said outer peripheral surface including a male thread portion thereupon, wherein said male thread portion is configured to engage a female thread portion disposed on an inner peripheral surface of a battery box;
a handle portion disposed on a second end surface of the battery;
wherein the pair of female terminals are configured to be connected to a corresponding pair of male terminals disposed on a bottom surface of the battery box, and wherein the battery is configured to be detachably mounted inside the battery box by being rotated therein, whereby the male thread portion of the battery engages the female thread portion of the battery box.

2. The battery according to claim 1, wherein a first male terminal is configured to engage one of the female terminals in a biased state,
said battery further comprising a guide groove in the first end surface of the battery, said guide groove extending in a circumferential direction around the axial center, and gradually deepening as the groove approaches the other of the female terminals, said battery including a step in a region where the other of the female terminals is connected to the guide groove.

3. A battery box for receiving a cylindrical battery therein, said battery box comprising:
a cylindrical inner surface, said cylindrical inner surface comprising a female thread portion thereof, said female thread portion configured to threadedly engage with a male thread portion of a battery;
a pair of male terminals disposed in a bottom surface of the battery box, said pair of male terminals configured to engage a pair of female terminals on the battery, whereby the battery box enables detachable mounting of the battery therein by rotating the battery so as to engage or disengage the male and female thread portions.

4. A system for mounting a cylindrical battery in a vehicle, said system comprising:
a battery comprising a pair of female terminals, wherein a first female terminal of the pair of female terminals is disposed in an axial center of the battery, and is recessed from a first end surface of the battery, and a second female terminal of the pair of female terminals being disposed in a position away from the axial center of the battery, and recessed from the first end surface of the battery, said battery including an outer peripheral surface, with a male thread portion disposed thereupon;
a handle portion disposed on a second end surface of the battery;
a battery box having an inner peripheral surface thereof, said inner peripheral surface including a female thread portion which is configured to threadedly engage with the male thread portion of the battery, said battery box including a pair of male terminals disposed on a bottom surface thereof, said pair of male terminals configured to engage and connect with the female terminals of the battery, wherein the battery is configured to be detachably mounted inside the battery box by being rotated such that the female thread portions and male thread portions are selectively engaged or disengaged.

5. The system according to claim 4, wherein a first male terminal of the pair of male terminals is configured to engage a corresponding one of the pair of female terminals, and includes a tip which is biased to engage the second female terminal, said battery including a guide groove connected to the second female terminal so as to extend in a circumferential direction around the axial center of the battery, and to become deeper as the groove approaches the second female terminal, and wherein a step is formed in a region where the second female terminal engages the guide groove.

6. The system according to 4, wherein the battery box is disposed in an electric component box of a vehicle, said system further comprising:
 a controller configured to control power to be supplied from the battery to a motor;
 a down regulator configured to step down the power of the battery; and
 a battery management unit configured to manage charging of the battery, wherein the controller, the down regulator, and the battery management unit are disposed in the electric component box,
 wherein the battery box is configured to avoid the controller, the down regulator, and the battery management unit.

7. The system according to claim 6, comprising at least two battery boxes; and
 a wire disposed in a space between the at least two battery boxes, the wire electrically connecting batteries respectively housed in the at least two battery boxes.

8. The system according to claim 6, wherein the electric component box includes an openable and closable lid member including a key cylinder therein; and
 wherein a projecting portion is configured to contact the battery and to restrict rotation of the battery, said projecting portion disposed on an inner surface of the lid member opposed to the second end surface of the battery.

9. The system according to claim 4, wherein the battery box is configured to be opened outward in a vehicle width direction.

* * * * *